US010583735B2

(12) United States Patent
Palazzolo et al.

(10) Patent No.: US 10,583,735 B2
(45) Date of Patent: Mar. 10, 2020

(54) TRANSFER CASE WITH ANTI-NEUTRAL DEVICE

(71) Applicant: BorgWarner Inc., Auburn Hills, MI (US)

(72) Inventors: Michael R. Palazzolo, Madison Heights, MI (US); Jesse Jongebloed, Clawson, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 543 days.

(21) Appl. No.: 15/476,388

(22) Filed: Mar. 31, 2017

(65) Prior Publication Data

US 2018/0281592 A1  Oct. 4, 2018

(51) Int. Cl.
*B60K 23/08* (2006.01)
*B60K 17/344* (2006.01)
*B60K 17/346* (2006.01)
*B60K 5/02* (2006.01)

(52) U.S. Cl.
CPC .......... *B60K 23/08* (2013.01); *B60K 17/3467* (2013.01); *B60K 5/02* (2013.01); *B60K 17/344* (2013.01); *B60K 2023/0825* (2013.01)

(58) Field of Classification Search
CPC .............. B60K 17/344; B60K 17/3467; B60K 23/0808; B60K 23/08
USPC ........................................................ 74/337.5
See application file for complete search history.

(56) References Cited

U.S. PATENT DOCUMENTS

| 5,150,637 A  * | 9/1992 | Ninomiya .............. B60K 23/08 180/249 |
| 6,230,577 B1 * | 5/2001 | Showalter ............. F16H 63/304 475/298 |
| 6,367,344 B1 * | 4/2002 | Vogt ........................ F16H 59/70 74/335 |
| 6,929,577 B2 * | 8/2005 | Mueller ............. B60K 17/3467 475/149 |
| 9,447,873 B2 | 9/2016 | Pritchard |
| 2002/0142877 A1* | 10/2002 | Williams ........... B60K 17/3465 475/198 |

* cited by examiner

*Primary Examiner* — Ha Dinh Ho
(74) *Attorney, Agent, or Firm* — Warn Partners, P.C.

(57) ABSTRACT

A transfer case for a vehicle is provided having a normal two wheel drive mode and a selective four wheel drive mode. The transfer case has a common motor for range shifting and clutch actuation and further has an anti-neutral drive biasing device preventing the range shifting assembly from dropping out of high or low gear to a neutral mode inadvertently.

7 Claims, 11 Drawing Sheets

TRANSFER CASE WITH ANTI-NEUTRAL DEVICE

FIELD OF THE INVENTION

The field of the present invention is that of transfer cases for normally two wheel rear drive mode vehicles with selective four wheel all-wheel-drive mode of operation.

BACKGROUND OF THE INVENTION

Many automotive vehicles have rear wheel drive. Additionally many automotive vehicles with rear wheel drive have selective four wheel drive capabilities which are actuated upon operator command or automatically actuated in response to a slip condition of the powered rear wheels of the vehicle. To provide four wheel drive capabilities in the vehicle, there is provided a transfer case. The transfer case is typically provided at an output of the vehicle's transmission. The transfer case often has an outer housing provided by front and rear shells. A front axle output shaft is bearingly supported in the front and rear shells and rotates about a secondary axis. A front axle output sprocket is torsionally connected on the front axle output shaft. A main input shaft rotates about a coaxially aligned primary axis generally parallel to the secondary axis. The main input shaft is bearingly supported directly or indirectly by the front and rear shells. The main input shaft is torsionally connected with an output shaft of the transmission of the vehicle and with a rear axle (via a prop shaft and differential) of the vehicle. A main sprocket is provided that is rotatably mounted on the main input shaft by a bushing. A belt, chain or gear provides a power transmission device located between the main input shaft and front axle output shaft. The power transmission device torsionally connects the main sprocket with the front axle output sprocket.

A clutch assembly includes a clutch housing coaxial with the primary axis and that is torsionally connected to the main sprocket. A hub is provided spline connected to main input shaft. The hub has a splined outer diameter surface. A friction pack is provided having a first plurality of friction members torsionally connected to the clutch housing. The first friction members are axially intertwined with a second plurality of friction members spline connected with the hub. A pressure plate is provided that is spline connected to the hub. The pressure plate is used to selectively engage and disengage the friction pack. A first ball ramp is positioned surrounding the main input shaft axially spring biased away from the pressure plate. A second ball ramp is provided for axial displacement relative to the first ball ramp. Relative displacement of the ball ramps causes the pressure plate to compressively activate the friction pack to torsionally connect the main input shaft and the hub with the clutch housing and main sprocket. The above noted torsional connection creates driving continuity transferring torque to front axle output shaft from the main input shaft.

Many transfer cases have high and low gear modes (or ranges) of operation. High mode is for normal operation, low gear is for instances the vehicle is in very difficult road conditions wherein maximum torque is required to move the vehicle. To allow towing of the vehicle without churning lubricant fluid in the transmission, the transfer case is typically also provided with a neutral mode of operation.

To reduce the spatial profile of transfer cases and to lower the weight of the transfer case a new design has been brought forth by Pritchard U.S. Pat. No. 9,447,873 (the disclosure of which is incorporated by reference herein). Pritchard has an electrical clutch actuating device or system and a range shifting assembly system that uses a common actuating motor. The Pritchard clutch actuating system and the range shifting assembly are coaxial with one another. Upon an inadvertent shift into the neutral mode due to a mechanical failure, the transfer case can possibly cause the transmission to be isolated from the front and rear axles and essentially place both axles in neutral, allowing the vehicle to move unless the vehicle brakes are applied. It is desirable to provide a Pritchard type transfer case wherein if there is a failure of the range shifting assembly, the transfer case will stay in either the high gear mode or low gear mode of operation.

SUMMARY OF THE INVENTION

To make manifest the above noted and other gainful desires, a revelation of the present invention is brought forth. The present invention endows a freedom of a transfer case for a normally rear wheel drive vehicle with selective four wheel drive capabilities, wherein the transfer case has a common motor for range shifting and clutch actuation and further has an anti-neutral drive biasing device preventing the range shifting assembly from dropping out of high or low gear to a neutral drive mode inadvertently.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
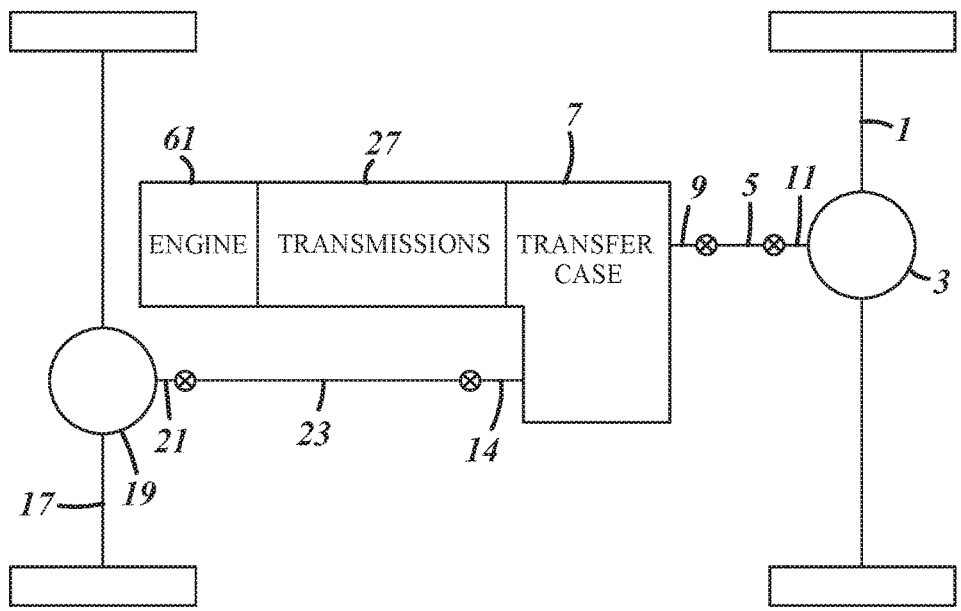
FIG. 1 is a schematic view of a transfer case of the present invention utilized in an automotive passenger, SUV, or light truck vehicle.
Figure 6:
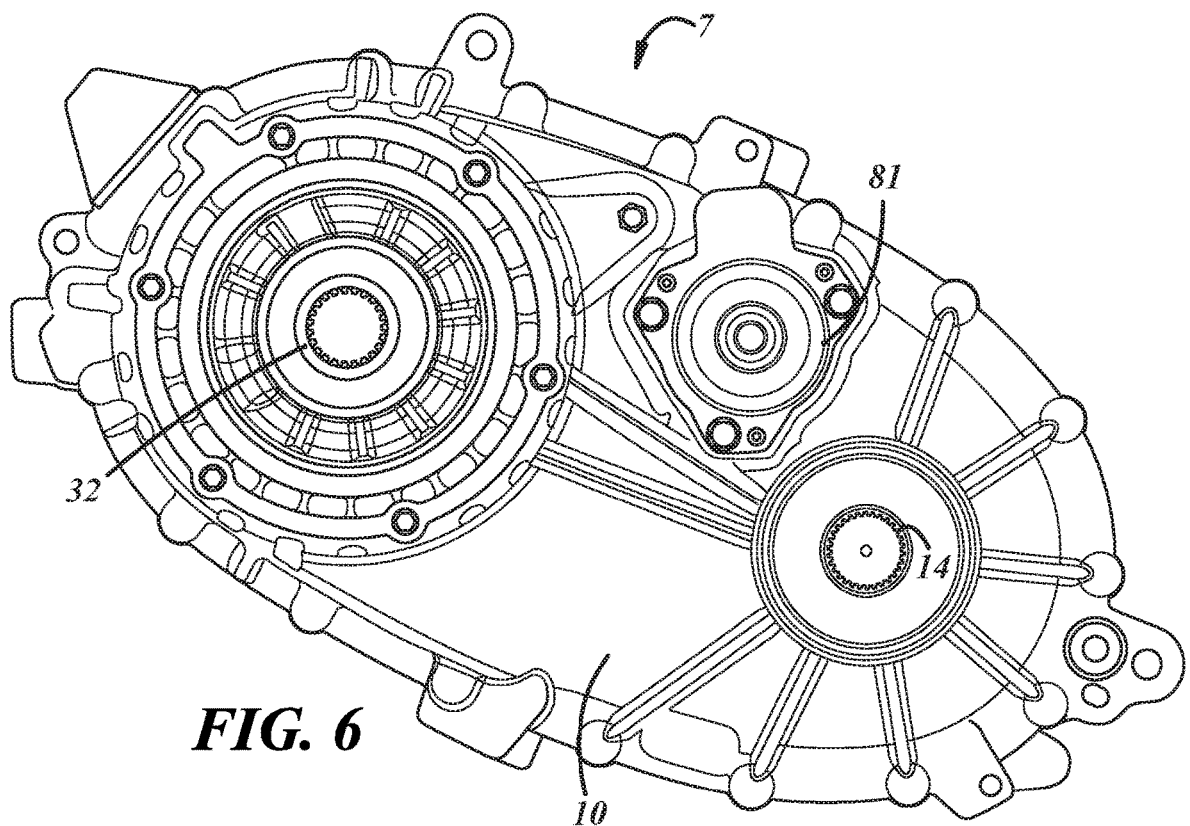
FIG. 6 is a front plane view of the transfer case shown in FIGS. 1 and 3.
Figure 2:
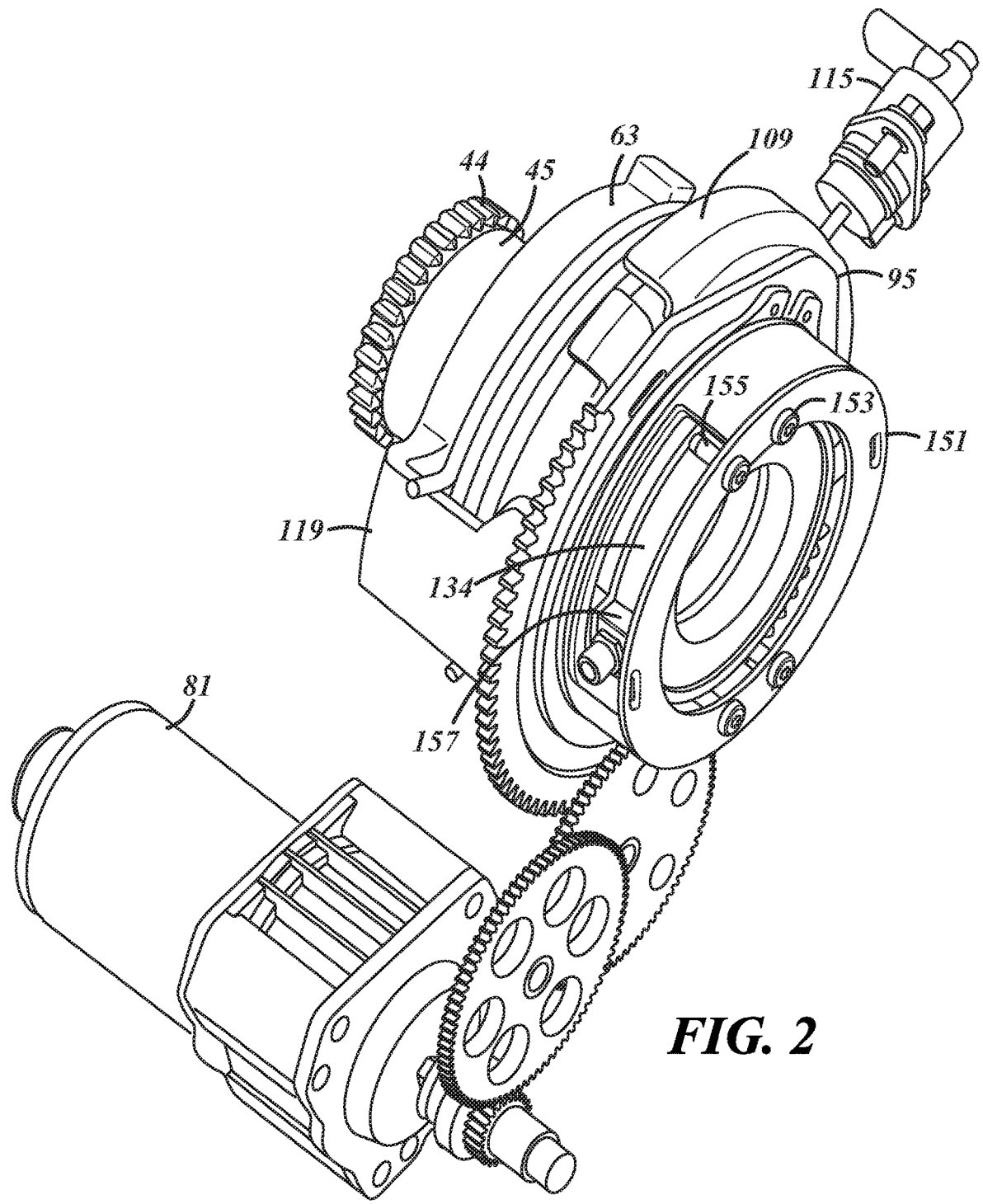
FIG. 2 is a perspective view of a portion of the transfer case shown in FIG. 1 illustrating portions of a range shifting assembly and portions of a device for actuating a clutch assembly.
Figure 3:
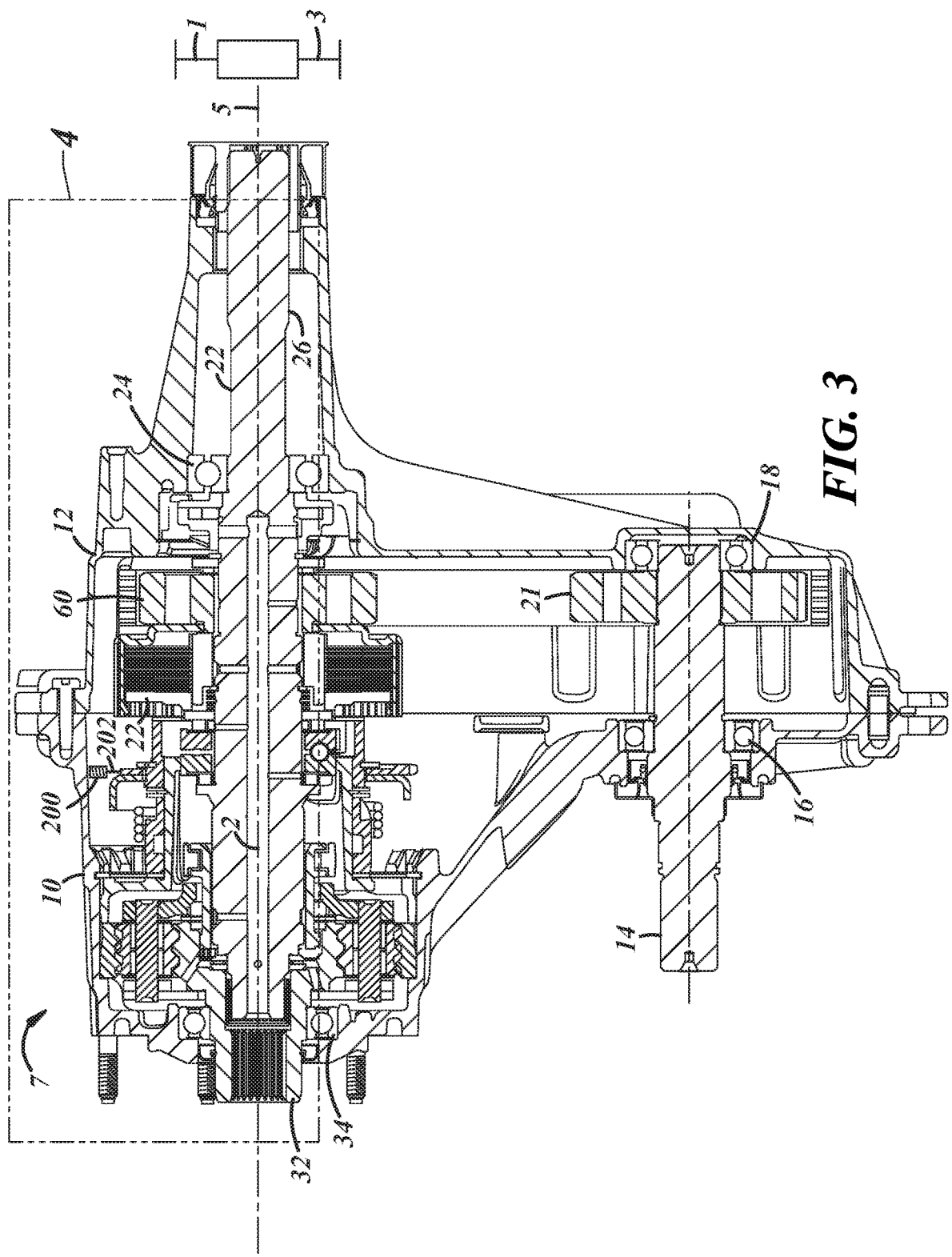
FIG. 3 is a sectional view of the transfer case shown in FIG. 1.

Referring to FIGS. 1-15, a transfer case 7 according to the present invention is provided. The transfer 7 case has a normally two wheel drive mode of operation and selective four wheel drive operational modes of operation. In its two wheel drive operation, transfer case 7 powers a rear axle (shown schematically) of the vehicle via a rear differential 3 and prop shaft 5, and rear couplings 9 and 11. The transfer case has a front shell 10 that is boltably connected with a rear shell 12 (FIG. 3). The transfer case 7 can selectively additionally power a front axle 17 via a front differential 19, front coupling 21, front prop shaft 23, and a front axle output shaft 14. The front axle output shaft 14 (rotatable about a secondary axis parallel to a primary axis 2) is bearingly supported by bearings 16 and 18, which are positioned in the front and rear shells 10 and 12 respectively. A front axle output sprocket 21 is torsionally connected in a fixed manner to the front axle output shaft 14.

Figure 4:
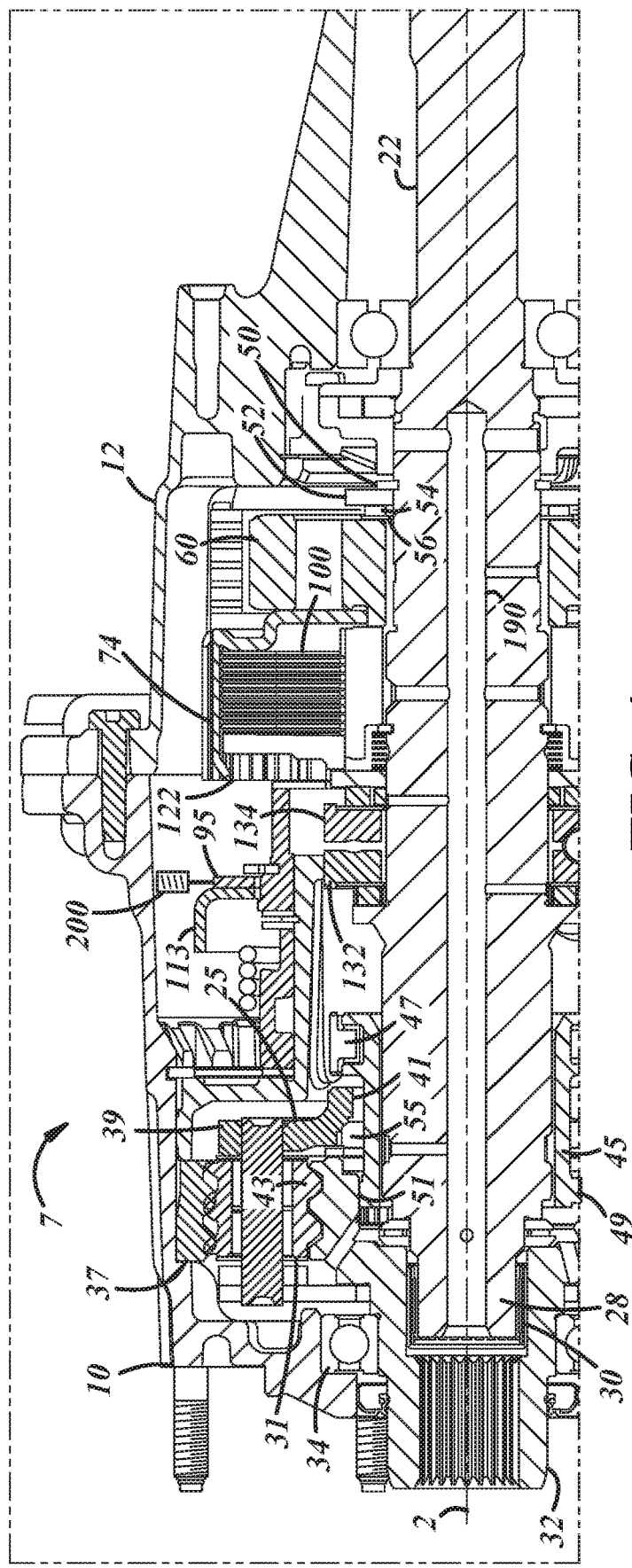
FIG. 4 is an enlargement of a portion of the transfer case shown in FIG. 3.
Figure 5:
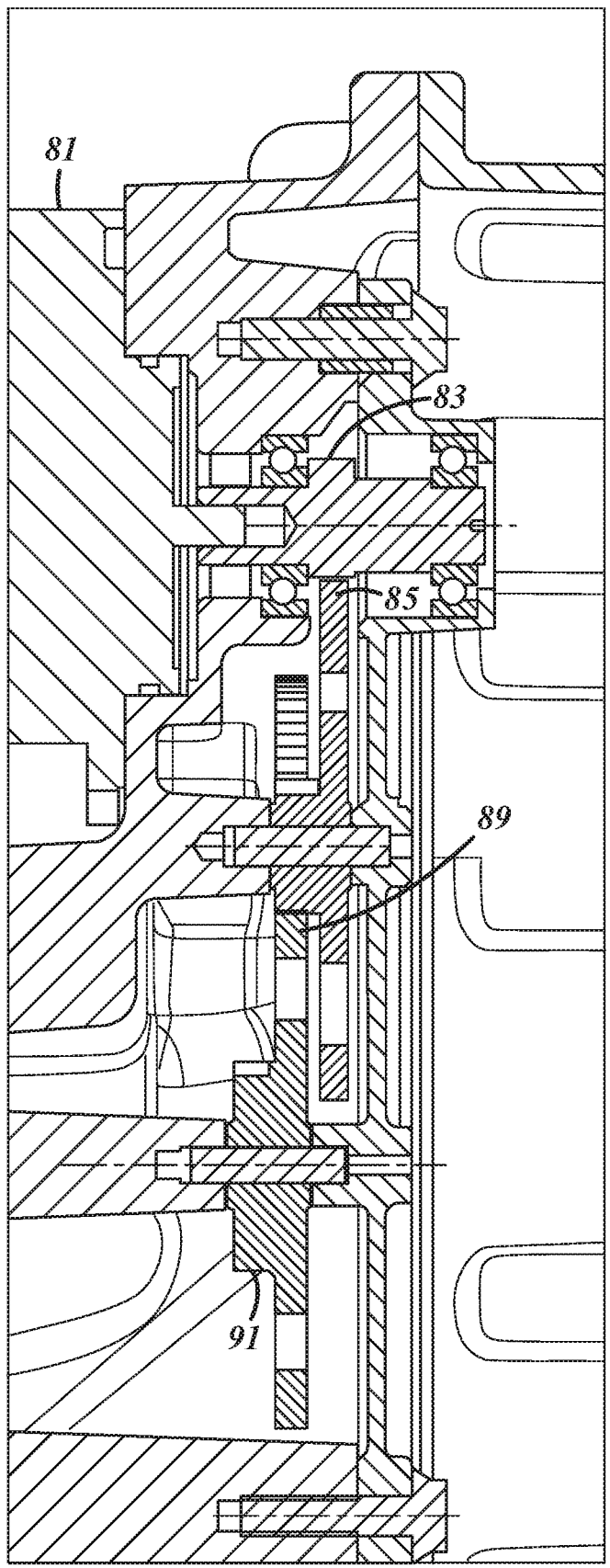
FIG. 5 is a sectional view of a portion of the transfer case shown in FIG. 1 illustrating a shift motor and a reduction gear train powered by the shift motor.
Figure 7:
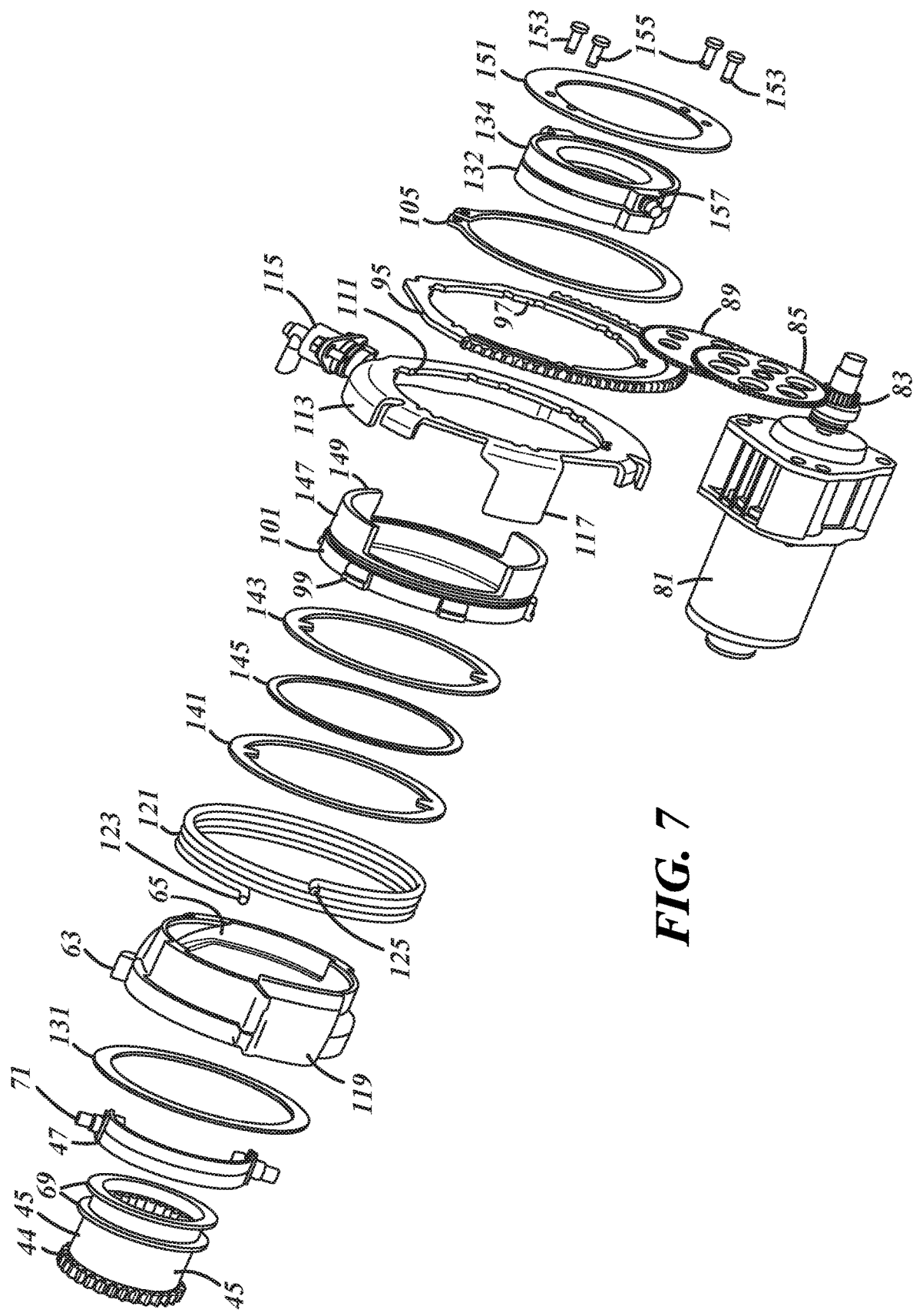
FIG. 7 is an exploded view of the range shifting assembly and clutch actuating device shown in FIG. 2.
Figure 8:
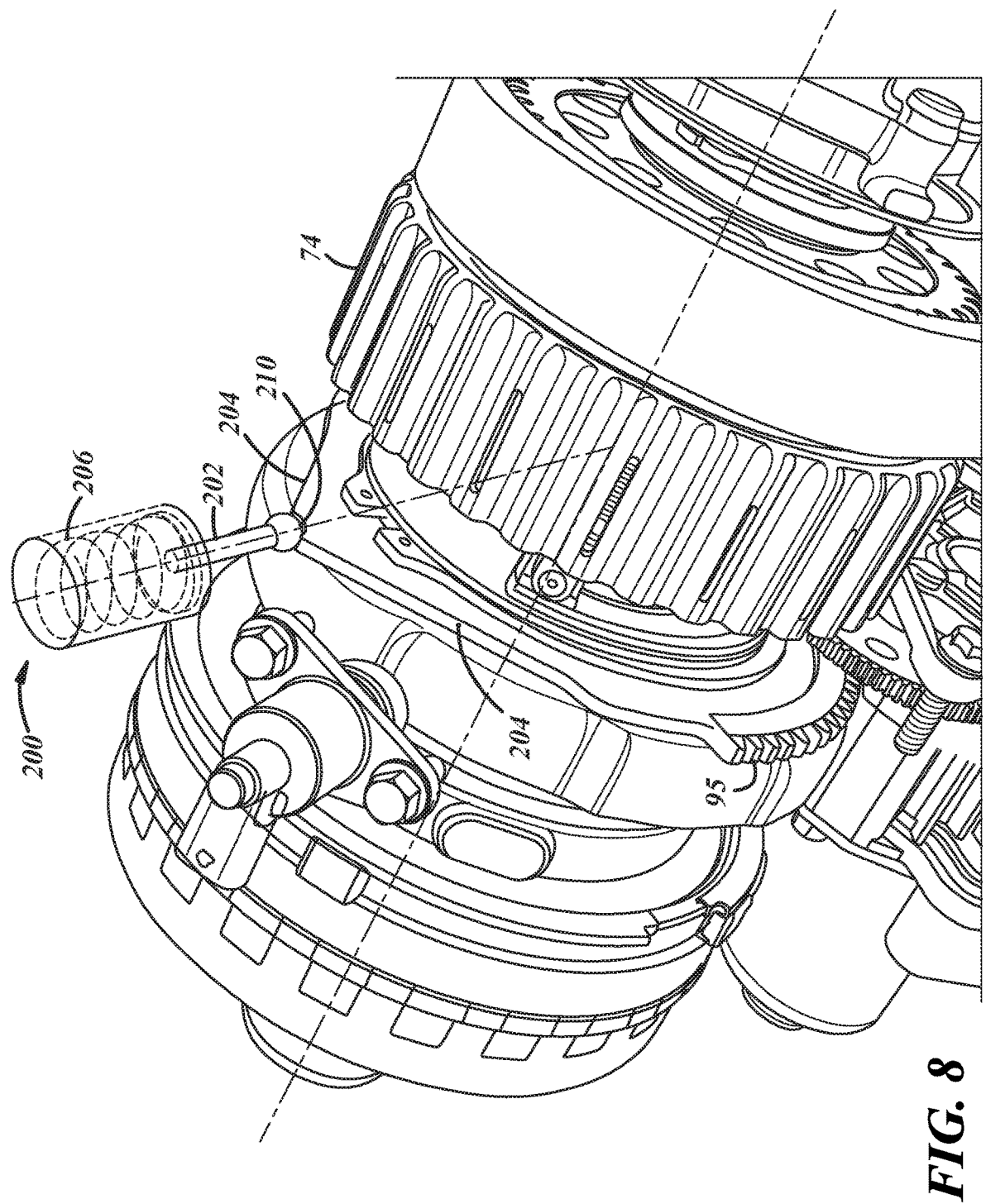
FIG. 8 is a perspective view of the range shift assembly and clutch assembly and clutch actuating device, and anti-neutral drive biasing device of the transfer case of the present invention.
Figure 9:
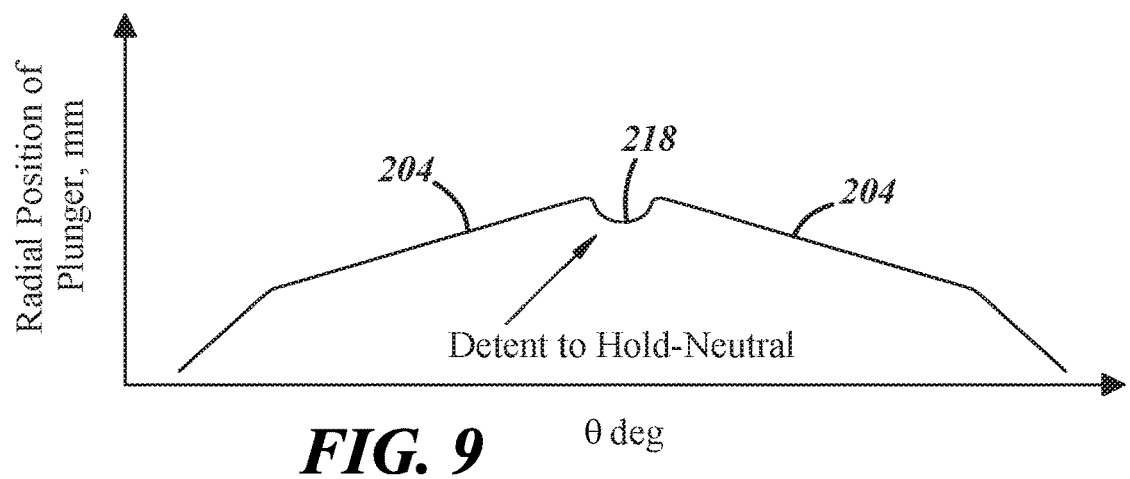
FIG. 9 is a graphic illustration of the radial position and plunger position of the anti-neutral biasing device shown in FIG. 8.

The transfer case 7 also has a main input shaft 22 roatatable about the primary axis 2. The main input shaft towards its rear end is bearingly supported in the rear shell 12 by bearing 24. A rear end 26 of the main input shaft is torsionally connected with the rear differential 3. A front end 8 of the main input shaft is supported by front shell 10 via needle bearing 30 (FIG. 4). Needle bearing 30 is positioned within an inner bore of a front input shaft or input gear 32. The input gear 32 is torsionally connected to an output shaft (shown schematically) of the transmission 27 of the vehicle. The input gear 32 is rotatably supported within the front shell 10 by a roller bearing 34. Input gear 32 is meshed with a planetary gear system including planet gears 31 and sun gear 37. The planet gears 31 rotate about a carrier shaft 39 that is connected with a carrier plate 25 having a geared interior bore 41. An exterior surface of the input gear 32 integrally forms a sun gear 43. When the transfer case 7 is in its normal high mode of operation, the main input shaft 22 is in direct drive with the input gear 32. To achieve the direct drive connection there is a reduction hub 45. Reduction hub 45 has an interior diameter spline connected to the main input shaft 22 and can axially translate thereon. A front end of the reduction hub 45 has a geared ridge 49 which can be meshed with a geared portion 51 of an inner diameter of the input gear 32. Movement of the reduction hub 45 by a shift fork assembly 47 to place the reduction hub ridge 49 in mesh with the geared interior bore of the carrier plate 41 causes power from the input gear 32 to transfer through the planetary gear system to the main input shaft causing a reduction in the gear ratio thereby increasing torque output of the transfer case 7 but reducing the transfer case speed. If the reduction hub 45 is moved to a position wherein the geared ridge 49 is in an intermediate position 55, the transfer case 7 is in a neutral gear mode of operation. When the transfer case 7 is in the neutral gear position the engine 61 of the vehicle and the transmission 27 of the vehicle are isolated from either the rear axle 1 or the front axle 17. Since the transmission 27 is also isolated from the front 17 and rear axles 1, the vehicle can be towed without churning the transmission's fluid or having to place the transmission 27 in the neutral position.

The main input shaft 22 has a radial groove supporting a snap ring 50. Snap ring 50 is adjacent a bearing race or washer 52. Washer 52 is adjacent bearing roller 54. A smaller washer 56 is also adjacent the roller 54. The combination of the snap ring 50, washers 52 and 56 and rollers 50 provide a first thrust bearing and axial stop.

Positioned axially against the washer 56 is a main sprocket 60. The main sprocket 60 is rotatably mounted on the main input shaft 22. A chain 72 torsionally connects the main sprocket 60 with the front axle sprocket 95.

A clutch housing 74 is also provided. The clutch housing has a splined inner diameter or opening to allow the clutch housing to be torsionally connected with main sprocket 21.

A hub 90 is spline connected on the main input shaft 22 forward of the main sprocket 60. The hub 90 has a splined outer diameter surface.

A friction pack 100 is provided. The friction pack has a first plurality of friction members torsionally connected to the clutch housing. The friction pack also has a second plurality of friction members spline connected with the hub 96 outer diameter. The second plurality of friction members typically will be metal plates with a consumable friction material coated or attached on opposite surfaces of the metal plates.

A pressure plate 22 is provided. The pressure plate 22 is spline connected to the outer diameter of the hub 90. The pressure plate 22 is provided for selective compressing of the friction pack 100. The friction pack 100 selectively torsionally connects the front axle output shaft 14 with the main input shaft 22.

A first ball ramp 134 faces a corresponding second ball ramp 132. The first ball ramp 134 is spring biased away from the pressure plate 122. Relative rotation between the first and second ball ramps 132, 134 causes the ball ramps to axially separate from one another. Axial movement of the first ball ramp 134 causes the pressure plate 122 to move to torsionally connect the main input shaft 22 with the front axle input shaft 14.

The transfer case 7 has a range shifting assembly and a clutch assembly that share common components. Fitted in the transfer case shells 10, 12 is a shift housing 61. Mounted for angular rotation on the shift housing 61 is a range shift cam 63. The interior of the range shift cam 63 has a groove path 65. Shift fork assembly 47 has a shift collar portion 67 that captures the reduction housing 45 between radial flanged portions 69 of the reduction hub. Studs 71 of the shift fork are positioned within the groove path 65 of the range shift cam 63. A shift motor 81 is provided. Shift motor 81 powers gear 83 which in turn powers gear 85 which in turn powers integrally connected gear 87 which in turn powers gear 89 which in turn powers gear 91 which is integrally connected to gear 89. Gear 91 is meshed with a dual drive gear 95. Dual drive gear 95 is concentric with the primary axis 2 and is axially interposed between the range shift assembly and the clutch housing 74.

Figure 10:
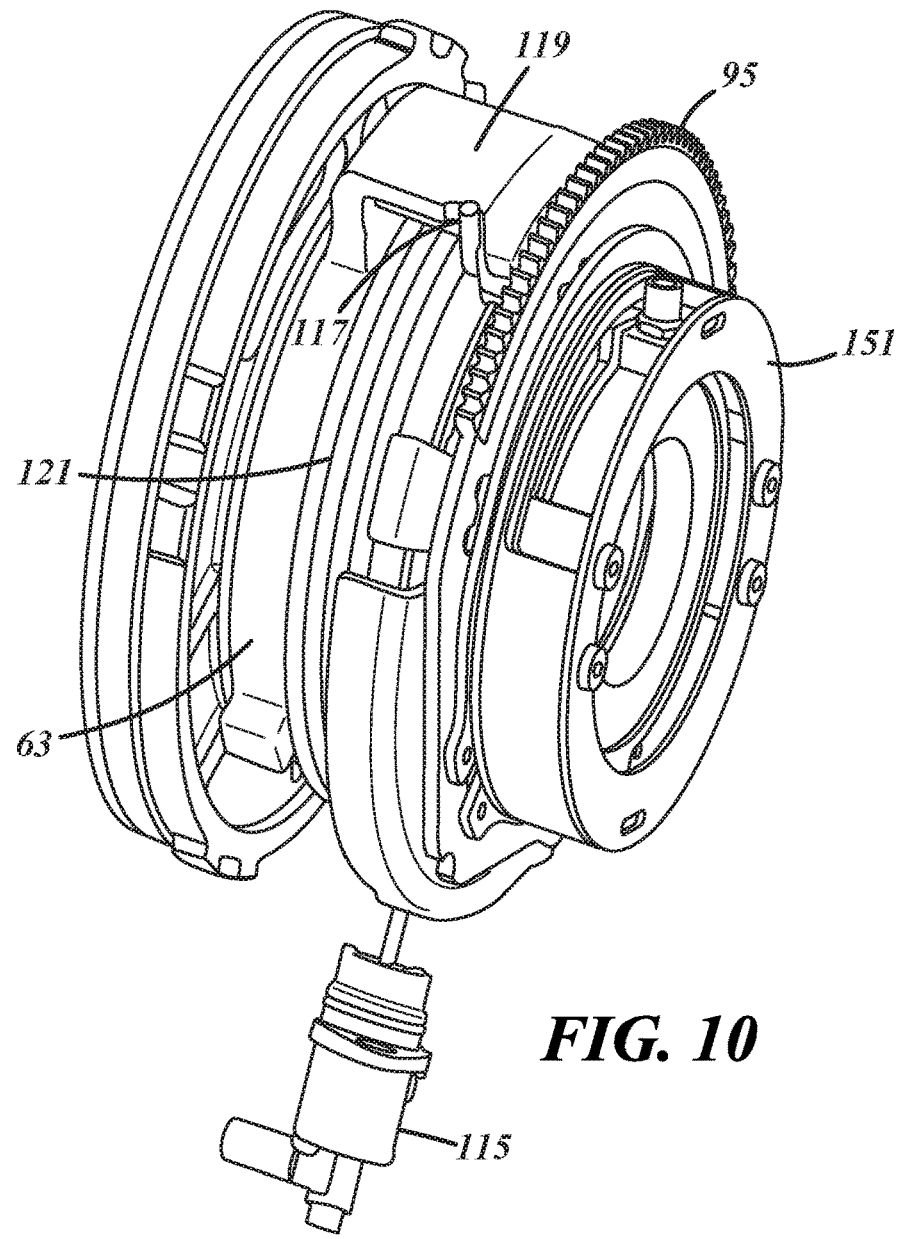
FIG. 10 is a perspective view of the range shifting assembly and clutch actuating device shown in FIG. 2.
Figure 11:
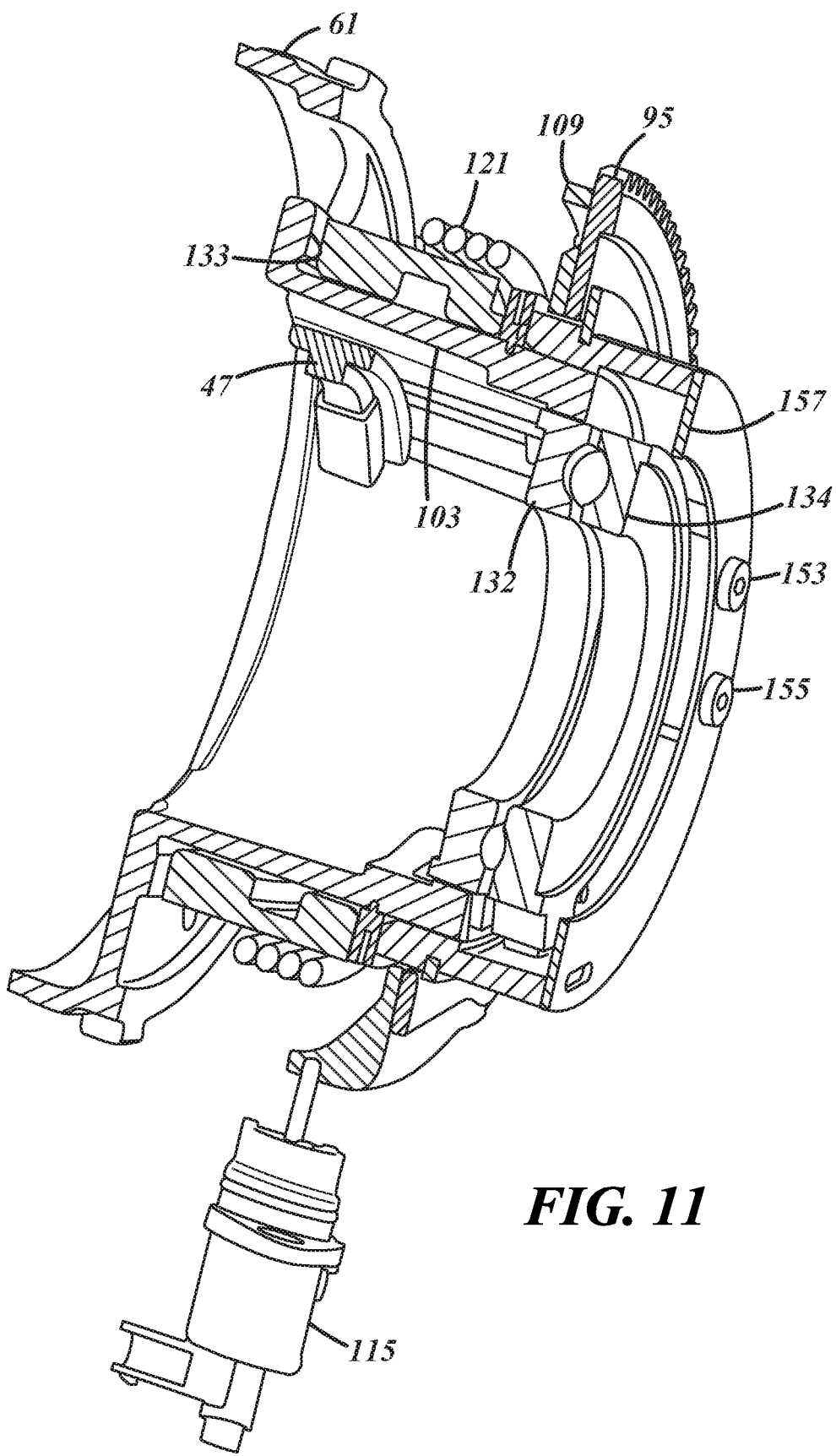
FIG. 11 is a sectional view of FIG. 10.
Figure 12:
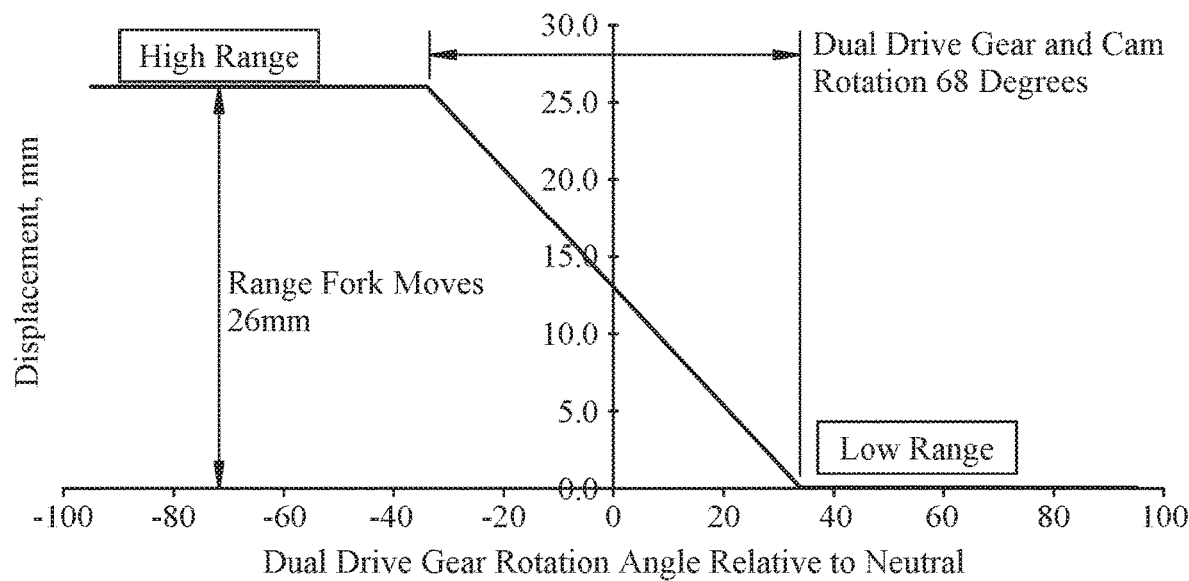
FIG. 12 is a graphic illustration of range shift hub position relative to dual drive gear rotation angle.
Figure 13:
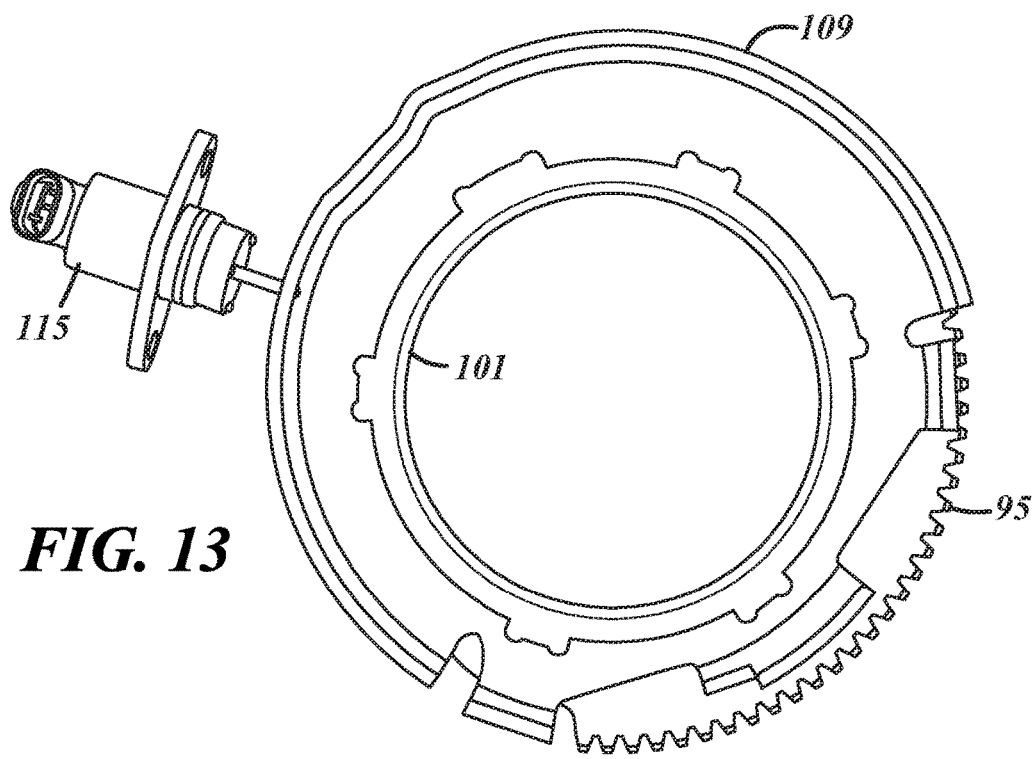
FIG. 13 is a sectional view illustrating the position sensor contacting the sensor plate.
Figure 14:
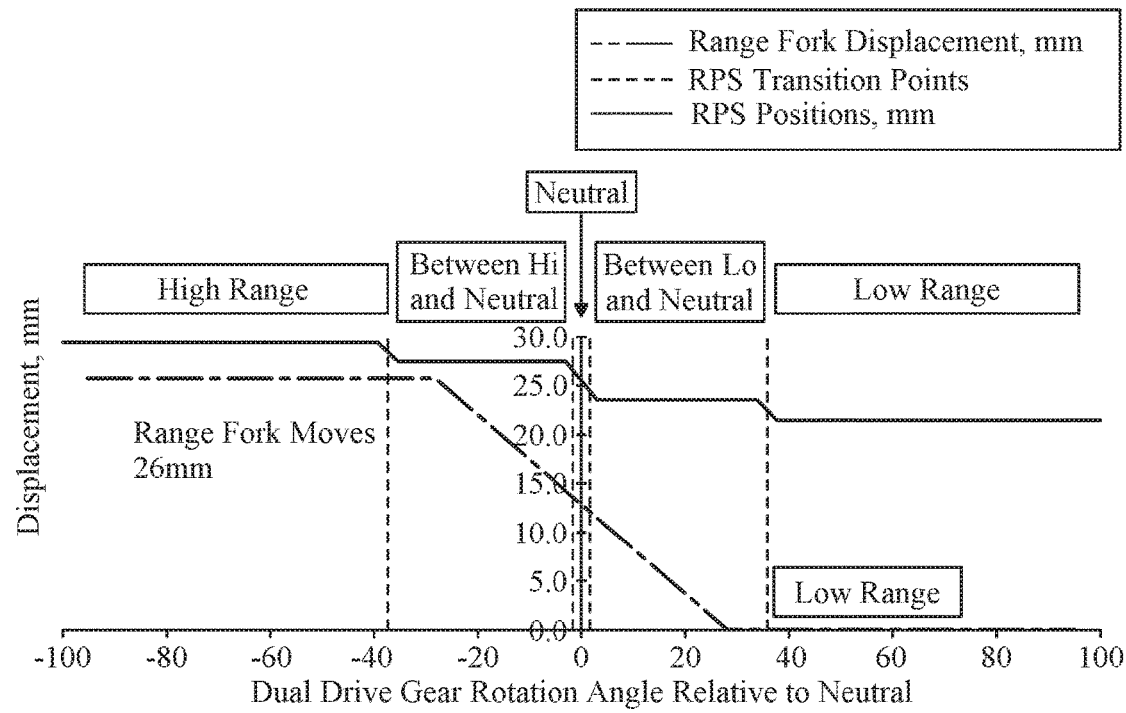
FIG. 14 is a graphic illustration of a dual drive gear reduction angle relative to a neutral position and range position sensor (RPS) transition points and position.
Figure 15:
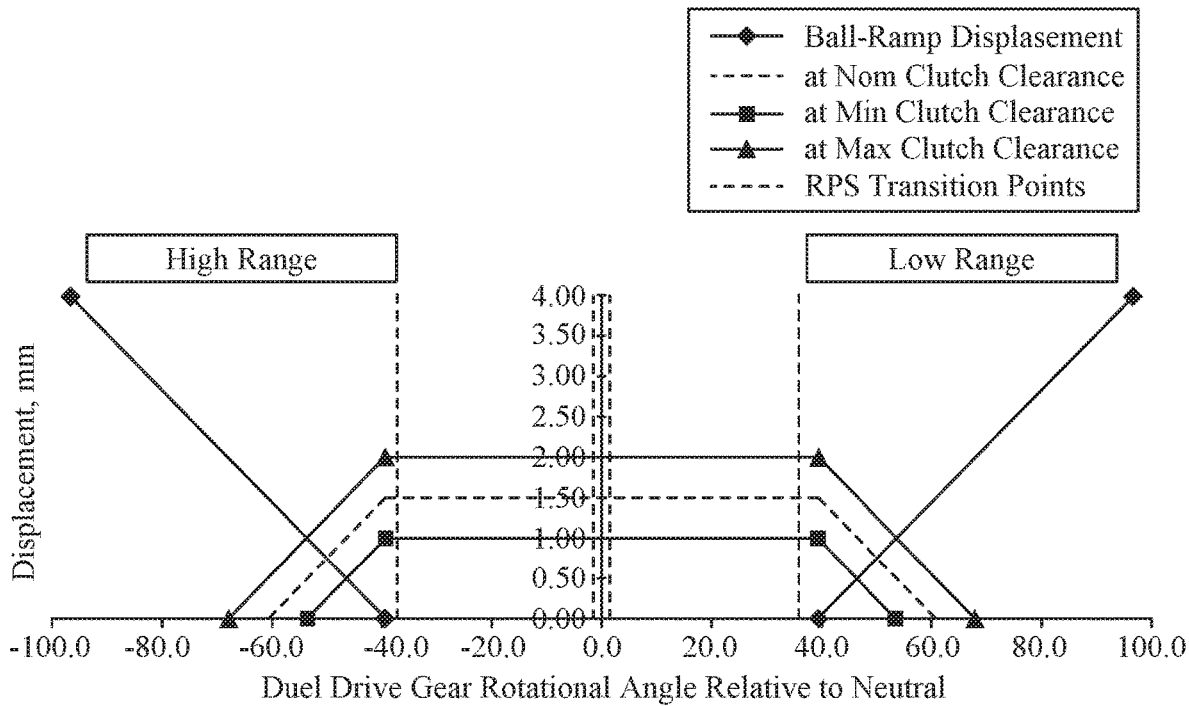
FIG. 15 is a graphic illustration of a dual drive gear rotation angle relative to a neutral position and additionally illustrates clutch pack clearance.

Dual drive gear 95 has notches 97 allowing its torsional connection with projections 99 provided on the direct drive gear hub 101. Direct drive gear hub 101 is mounted for angular rotation on a smaller cylinder portion 103 of the shift housing 61. A snap ring 105 fitted in a groove on the direct drive gear hub 101 traps the dual drive gear 95 against a sensor plate 109. The sensor plate 109 is also provided to allow for a determination of angular position of the direct drive gear 95. The sensor plate 109 has notches 111 in a manner similar to that of the direct drive gear allowing it to be torsionally connected on the direct drive gear hub 101. The sensor plate 109 has a generally cylindrical rim 113 provided for contact with a position sensor 115 having an extendable plunger. The sensor plate 109 also has a generally axially extending power arm 117. The power arm 117 extends into a circumferential pocket 119 formed on the outer surface of the range shift cam. A torsion spring 121 provided having a forward radial arm 123 and a rearward radial arm 125. The axially extending arm 117 of the sensor plate is positioned within the pocket 119 and hits rearward radial arm 125 of the spring. As best shown in FIG. 10, if the dual drive gear is rotated in a clockwise direction looking right to left the arms 117 will push against spring radial arm 123 to rotate the range shift cam in a clockwise direction to push the reduction hub 45 forward to place the transfer case 7 in the high mode of operation (see FIGS. 12 and 14). If a shift hang-up should occur torsion spring 121 will provide compliance in the system since the axially extending arm 117 acts upon the range shift cam via the torsion spring radial arms 123, 125. To place the transfer case 7 in the low range mode of operation the dual drive gear 95 will be rotated in the opposite direction causing the range shift cam 63 to be rotated counterclockwise and thereby pulling the reduction hub 45 to the right. A thrust washer 131 is provided between an axial face of the range shift cam and a generally radial extending portion 133 of the shift housing.

Between the range shift cam 63 and the dual drive gear hub 101 are thrust rings 141, 143 and intermediate snap ring 145. Dual drive gear hub 101 has two axially extending arcuate arms 147. An end face 149 of the arcuate arms 147 is connected with an annular plate 151. Annular plate 151 is connected with arcuate arms 147 by fastener pins 153. Annular plate 151 is also provided with ball cam contact pins 155. Ball ramp 134 has radial extensions 157 for selective contact with contact pins 155. Upon appropriate rotation of the dual drive gear 95 in an extreme direction (see FIG. 15) in either direction of rotation ball ramp 134 will be rotated to actuate the clutch assembly.

Upon a potential failure of the shift motor 81 or gears 83, 85, 87 and 91, mechanical vibration of the vehicle or vehicle drive train can inadvertently cause rotation of the dual drive gear 95 to a position placing the transfer case 7 in a neutral position. In other words, the reduction hub 45 can be inadvertently translated to a position wherein the geared ridge 49 is at position 55 instead of being engaged either the inlet gear portion 51 or the carrier plate geared portion 41. To prevent the inadvertent shifting to the neutral gear position there is provided and anti-neutral drive biasing device 200. The anti-neutral drive biasing device 200 is provided by a plunger 202 and cam surfaces 204 on the dual drive gear. Upon any potential failure of the shift gears or reduction gears, the plunger 202 (spring biased by a spring 206 within a frame 208) contacts one of cam surfaces 204 to prevent the rotation of the dual drive gear 95 to a neutral gear position.

The shift motor 81 via the gear train during normal operation can overcome the force of the plunger 202 on dual drive gear 95. Accordingly, transfer case 7 cannot be inadvertently placed in neutral. Cam surface 204 has a detent to 210 to receive plunger 202 when it is desirable to deliberately place the transfer case 7 in the neutral position. Thus transfer case 7 can safely be placed in neutral gear position to allow for towing the vehicle on either the front or rear axle or both front and rear axles for long distance towing.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transfer case for an automotive passenger, SUV and light truck vehicles comprising:
    a front input shaft having a primary axis of rotation,
    a main input shaft coaxially aligned with and rotatable about the primary axis,
    a front axle output shaft rotatable about a secondary axis parallel to the primary axis,
    a power transmission device located between the main input shaft and the front axle output shaft;
    a range shifting assembly coaxial with respect to the primary axis, the range shifting assembly operably connected between the front input shaft and the main input shaft to axially shift between a low-range drive mode, a neutral drive mode, and a high-range drive mode;
    a clutch assembly located coaxial with respect to the primary axis and axially adjacent to said range shifting assembly, the clutch assembly operably connected to the power transmission device to axially move between an engaged position and a disengaged position to transfer into or out of a state creating driving continuity for transferring drive torque between said main input shaft and the front axle output shaft;
    an actuating device including a rotatable concentric gear mounted coaxial with respect to the primary axis and axially interposed between the range shifting assembly and the clutch assembly, the concentric gear actuating the range shifting assembly during a portion of angular rotation about the primary axis and actuating the clutch assembly during a mutually exclusive portion of angular rotation about the primary axis, and
    an anti-neutral drive biasing device urging said range shifting assembly out of a neutral drive mode.

2. A transfer case as described in claim 1 wherein said anti-neutral drive biasing device includes a spring biased plunger contacting a cam surface on said concentric gear.

3. A transfer case as described in claim 2 wherein said cam surface on said concentric gear has a neutral detent.

4. A transfer case for an automotive passenger, SUV and light truck vehicles comprising:
    a front input shaft having a primary axis of rotation,
    a main input shaft coaxially aligned with and rotatable about the primary axis,
    a front axle output shaft rotatable about a secondary axis parallel to the primary axis,
    a power transmission device located between the main input shaft and the front axle output shaft;
    a range shifting assembly coaxial with respect to the primary axis, the range shifting assembly operably connected between the front input shaft and the main input shaft to axially shift between a low-range drive mode, a neutral drive mode, and a high-range drive mode;
    a clutch assembly located coaxial with respect to the primary axis and axially adjacent to said range shifting assembly, the clutch assembly operably connected to the power transmission device to axially move between an engaged position and a disengaged position to transfer into or out of a state creating driving continuity for transferring drive torque between said main input shaft and the front axle output shaft;

an actuating device including a rotatable concentric gear mounted coaxial with respect to the primary axis and axially interposed between the range shifting assembly and the clutch assembly, the concentric gear actuating the range shifting assembly during a portion of angular rotation about the primary axis and actuating the clutch assembly during a mutually exclusive portion of angular rotation about the primary axis;

an anti-neutral drive biasing device urging said range shifting assembly out of a neutral drive mode and wherein said anti-neutral drive biasing device includes a spring biased plunger contacting a cam surface on said concentric gear; and wherein said cam surface on said concentric gear has a neutral detent.

5. A method of providing a transfer case for an automotive passenger, SUV and light truck vehicles comprising:

providing a front input shaft having a primary axis of rotation, providing a main input shaft coaxially aligned with and rotatable about the primary axis, providing a front axle output shaft rotatable about a secondary axis parallel to the primary axis, providing a power transmission device located between the main input shaft and the front axle output shaft;

providing a range shifting assembly coaxial with respect to the primary axis, the range shifting assembly operably connected between the front input shaft and the main input shaft to axially shift between a low-range drive mode, a neutral drive mode, and a high-range drive mode;

providing a clutch assembly located coaxial with respect to the primary axis and axially adjacent to said range shifting assembly, the clutch assembly operably connected to the power transmission device to axially move between an engaged position and a disengaged position to transfer into or out of a state creating driving continuity for transferring drive torque between said main input shaft and the front axle output shaft;

providing an actuating device including a rotatable concentric gear mounted coaxial with respect to the primary axis and axially interposed between the range shifting assembly and the clutch assembly, the concentric gear actuating the range shifting assembly during a portion of angular rotation about the primary axis and actuating the clutch assembly during a mutually exclusive portion of angular rotation about the primary axis, and providing an anti-neutral drive biasing device urging said range shifting assembly out of a neutral drive mode.

6. A method of providing a transfer case as described in claim 1 further including contacting a cam surface on said concentric gear with a spring biased plunger.

7. A method of providing a transfer case as described in claim 6 further including providing a neutral detent on said cam surface at said concentric gear.

* * * * *